United States Patent [19]
Bernabei

[11] Patent Number: 5,310,034
[45] Date of Patent: May 10, 1994

[54] SUPPORTING HUB FOR CLUTCH AND PUMP ASSEMBLY

[75] Inventor: Louis M. Bernabei, S. Beloit, Ill.

[73] Assignee: Dana Corporation, Toledo, Ohio

[21] Appl. No.: 973,291

[22] Filed: Nov. 9, 1992

[51] Int. Cl.⁵ .................... F16D 13/58; F16D 27/00
[52] U.S. Cl. ................. 192/115; 192/84 C; 248/674
[58] Field of Search ............ 192/115, 84 C; 417/319; 248/639, 674, 677

[56] References Cited

U.S. PATENT DOCUMENTS

| | | |
|---|---|---|
| 1,082,183 | 12/1913 | Vernon . |
| 1,538,881 | 5/1925 | Barton . |
| 1,665,765 | 4/1928 | Barton . |
| 2,368,537 | 1/1945 | Gilbert . |
| 2,683,006 | 7/1954 | Nichols . |
| 3,044,594 | 7/1962 | Bernard ................ 192/84 C |
| 3,246,725 | 4/1966 | Brashear .............. 192/84 C X |
| 3,254,746 | 6/1966 | Myers ................... 192/84 C |
| 3,432,705 | 3/1969 | Lindtveit . |
| 3,610,781 | 10/1971 | Kolb . |
| 3,863,743 | 2/1975 | Rule et al. ............ 192/84 C |
| 4,150,738 | 4/1979 | Sayo et al. ............ 192/84 C |
| 4,169,360 | 10/1979 | Shimizu ................ 417/319 X |
| 4,425,520 | 1/1984 | Hiraga ................... 192/84 C X |
| 4,601,378 | 7/1986 | Pierce et al. . |
| 4,697,782 | 10/1987 | Ban . |
| 4,859,156 | 8/1989 | Kikuchi ................ 417/319 |
| 4,877,984 | 10/1989 | Colwell et al. . |
| 5,195,625 | 3/1993 | Chang et al. ........ 417/319 X |

*Primary Examiner*—Rodney H. Bonck
*Attorney, Agent, or Firm*—MacMillan, Sobanski & Todd

[57] ABSTRACT

A hub adapted to support an electromagnetic clutch and a hydraulic pump thereon is disclosed. The hub is generally hollow and cylindrical in shape, including a first annular mounting portion having an inner cylindrical mounting surface. The inner cylindrical mounting surface is sized to receive and precisely position therein a cylindrical flange of the hydraulic pump. The hub also includes an enlarged cylindrical flange portion disposed adjacent to the first mounting portion. A plurality of apertures are formed through the flange portion for securing it to an external mounting bracket. The hub further includes a second annular mounting portion having an outer cylindrical mounting surface. The outer cylindrical mounting surface is sized to receive and precisely position thereon a bearing assembly of the electromagnetic clutch. Thus, the hub provides precise co-axial mounting surfaces for both the hydraulic pump and the electromagnetic clutch. By mounting the hydraulic pump and the electromagnetic clutch in this manner, the rotational axes of the components thereof are precisely maintained co-axial during use.

16 Claims, 2 Drawing Sheets

SUPPORTING HUB FOR CLUTCH AND PUMP ASSEMBLY

BACKGROUND OF THE INVENTION

This invention relates in general to pump and clutch assemblies and in particular to an improved structure for a hub adapted to support an electromagnetic clutch and a hydraulic pump thereon.

Hydraulic pumps are well known devices which are adapted to be mechanically driven so as to generate a flow of hydraulic fluid to a controlled device. For example, hydraulic pumps are frequently provided on refuse trucks for operating a hydraulically actuated ram. The hydraulic pump is mechanically connected to the engine of the vehicle so as to be driven thereby. In some applications, the hydraulic pump is constantly driven by the vehicle engine, and one or more control valves are provided for selectively operating the ram. While this structure is operable, it is rather inefficient because a significant amount of energy is consumed by the pump as it is constantly driven.

To address this, it is known to provide a clutch between the vehicle engine and the hydraulic pump such that the hydraulic pump is driven by the vehicle engine only when operation of the controlled device is desired. For example, electromagnetically actuated clutches have been provided for selectively connecting the vehicle engine to the hydraulic pump. Such an electromagnetic clutch typically includes a circular pulley or similar member which is connected by a belt or other means to the vehicle engine. Thus, the pulley is constantly rotatably driven by the vehicle engine. The electromagnetic clutch further includes an armature assembly which is selectively connected to the pulley for rotation therewith. The hydraulic pump has an input shaft which is connected to the armature assembly for rotation therewith. Thus, when the clutch is engaged, the hydraulic pump is driven to cause actuation of the controlled device. When the clutch is disengaged, the hydraulic pump is not driven, thereby preventing operation of the controlled device.

It is known to mount both the hydraulic pump and the electromagnetic clutch on a common support bracket or similar structure for convenience. However, known support brackets are deficient because the rotational axes of the armature assembly of the electromagnetic clutch and the input shaft of the hydraulic pump are not maintained precisely co-axial. As a result, premature wear on the bearings in both the electromagnetic clutch and the hydraulic pump can occur. Accordingly, it would be desirable to provide an improved structure for supporting an electromagnetic clutch and a hydraulic pump which maintains the two components precisely co-axial during operation.

SUMMARY OF THE INVENTION

This invention relates to an improved structure for a hub adapted to support an electromagnetic clutch and a hydraulic pump thereon. The hub is generally hollow and cylindrical in shape, including a first annular mounting portion having an inner cylindrical mounting surface. The inner cylindrical mounting surface is sized to receive and precisely position therein a cylindrical flange of the hydraulic pump. The hub also includes an enlarged cylindrical flange portion disposed adjacent to the first mounting portion. A plurality of apertures are formed through the flange portion for securing it to an external mounting bracket. The hub further includes a second annular mounting portion having an outer cylindrical mounting surface. The outer cylindrical mounting surface is sized to receive and precisely position thereon a bearing assembly of the electromagnetic clutch. Thus, the hub provides precise co-axial mounting surfaces for both the hydraulic pump and the electromagnetic clutch. By mounting the hydraulic pump and the electromagnetic clutch in this manner, the rotational axes of the components thereof are precisely maintained co-axial during use.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
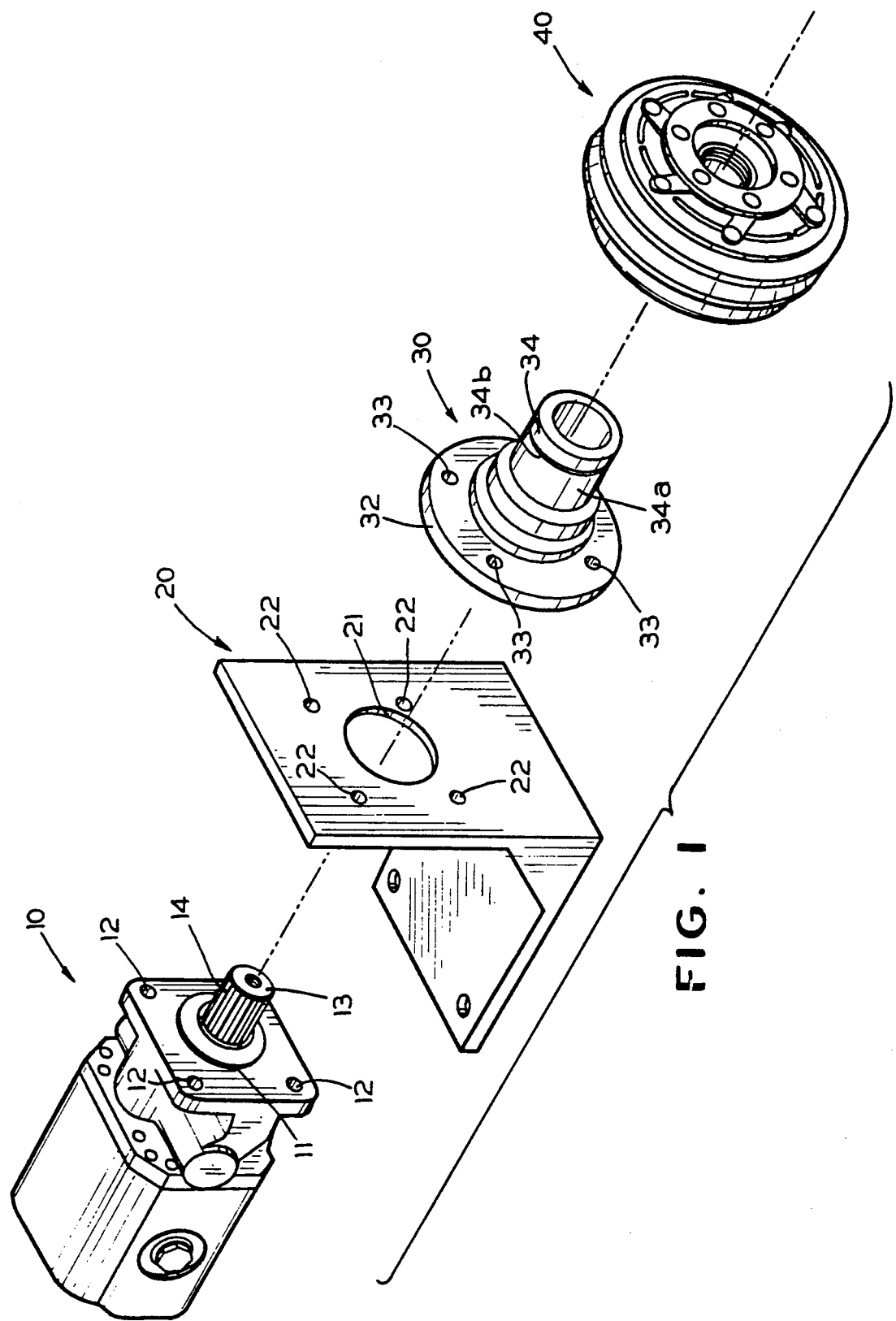
FIG. 1 is an exploded perspective view of an electromagnetic clutch and hydraulic pump assembly including an improved supporting hub in accordance with this invention.

Referring now to the drawings, there is illustrated an assembly including a hydraulic pump 10, a mounting bracket 20, a support hub 30, and an electromagnetic clutch 40. The hydraulic pump 10 is conventional in the art and includes a flange or shoulder 11 protruding from one end thereof. The flange 11 includes an outer surface which is preferably cylindrical in shape. The purpose of the outer surface of the flange 11 will be explained below. A plurality of axially extending apertures 12 are formed through the flange 11, also for a purpose which will be explained below. The apertures 12 are preferably not threaded. A rotatable input shaft 13 extends co-axially through the flange 11. The end of the input shaft 13 is formed having a key 14 or similar means for connecting it to another member for rotation therewith. As is well known in the art, rotation of the input shaft 13 causes the hydraulic pump 10 to generate a flow of hydraulic fluid to a controlled device (not shown).

Figure 2:
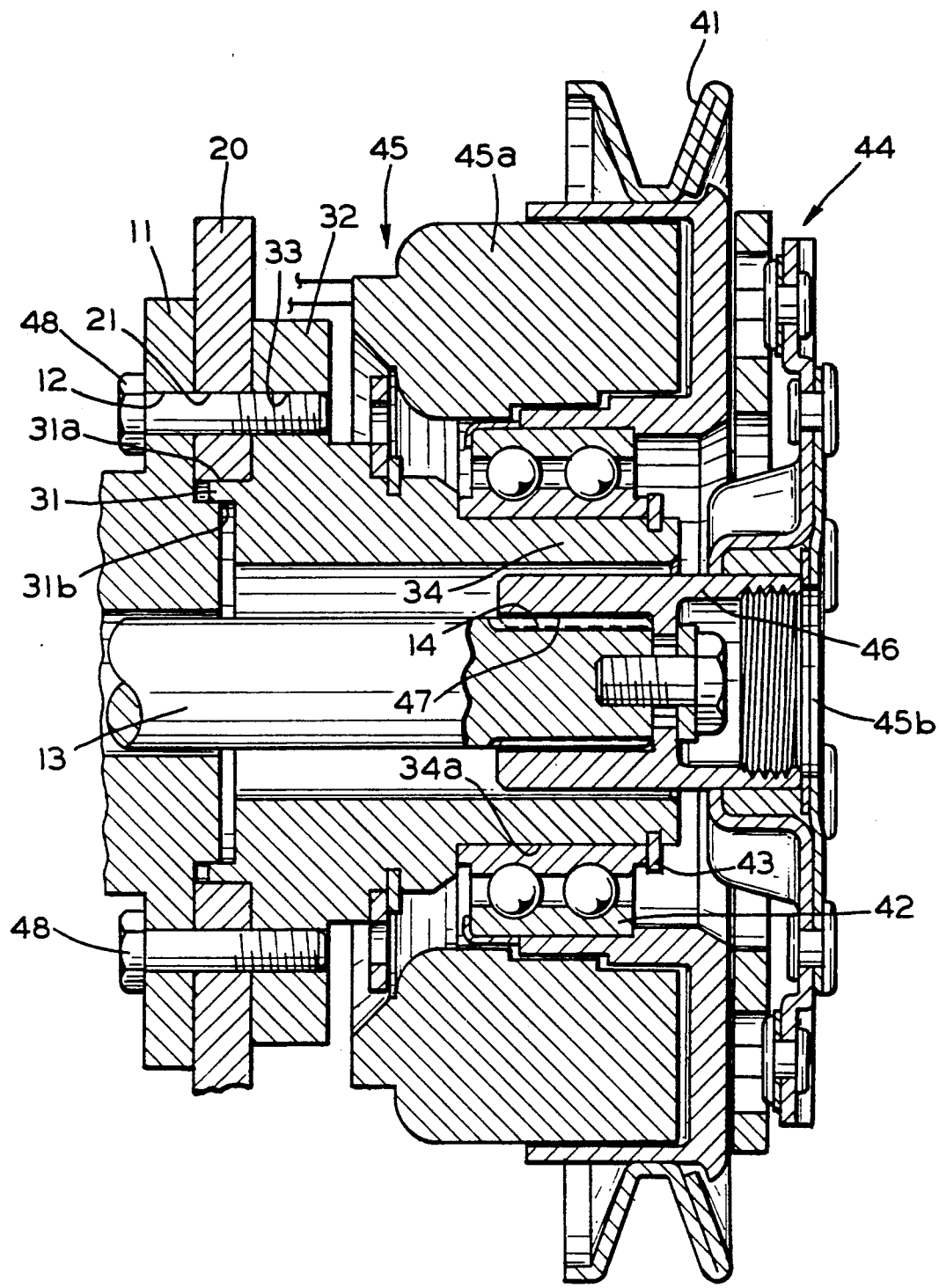
FIG. 2 is a sectional elevational view of the electromagnetic clutch and hydraulic pump assembly illustrated in FIG. 1.

The mounting bracket 20 is also conventional in the art and is provided to support the entire assembly upon a fixed surface (not shown). The illustrated mounting bracket 20 is generally L-shaped in configuration, although it may be formed in any desired shape. One portion of the mounting bracket 20 has an enlarged opening 21 formed therethrough defining an inner surface which is preferably cylindrical in shape. The diameter of the inner surface of the enlarged opening 21 is somewhat larger than the diameter of the outer cylindrical surface of the flange 11 provided on the hydraulic pump 10, as best shown in FIG. 2. Thus, the flange 11 of the hydraulic pump 10 can be inserted within the enlarged opening 21 of the mounting bracket 20. However, because of the size differential, the flange 11 is not positioned or otherwise precisely supported within the enlarged opening 21. A plurality of apertures 22 are formed through the mounting bracket 20 which are generally co-axially aligned with the apertures 12 formed through the flange 11. As with the apertures 12, the apertures 22 are preferably not threaded. The purpose of these apertures 22 will also be explained below.

The hub 30 is generally hollow and cylindrical in shape, having a first annular mounting portion 31 formed on a first end thereof (the left end when viewing FIG. 2). The first mounting portion 31 includes an outer mounting surface 31a and an inner mounting surface 31b, both of which are preferably cylindrical in shape. The cylindrical mounting surfaces 31a and 31b are concentric with one another. The diameter of the outer cylindrical mounting surface 31a is slightly smaller than the diameter of the inner surface of the enlarged opening 21 formed through the mounting bracket 20. Thus, the hub 30 is piloted concentrically within the enlarged opening 21 of the mounting bracket 20 when assembled as shown in FIG. 2. Similarly, the diameter of the inner cylindrical mounting surface 31b is slightly larger than the diameter of the outer surface of the flange 11 provided on the hydraulic pump 10. Thus, the pump 10 (and the input shaft 13 thereto) are piloted concentrically within the enlarged opening 21 of the mounting bracket 20 and within the hub 30 when assembled as shown in FIG. 2.

The hub 30 further includes an enlarged cylindrical flange portion 32 disposed adjacent to the first mounting portion 31. A plurality of apertures 33 are formed through the flange portion 32. The apertures 33 are generally co-axially aligned with the apertures 12 formed through the flange 11 and the apertures 22 formed through the mounting bracket 20. However, unlike the apertures 12 and 22, the apertures 33 are preferable threaded. The purpose of the apertures 33 will also be explained below.

Lastly, the hub 30 includes a second annular mounting portion 34 formed on a second end thereof (the right end when viewing FIG. 2). The second mounting portion 34 includes an outer mounting surface 34a which is preferably cylindrical in shape. A groove 34b is formed in the mounting surface 34a adjacent the end thereof. The purpose of the mounting surface 34a and the groove 34b will be explained below.

The electromagnetic clutch 40 is also conventional in the art and includes a rotor pulley assembly 41 which is supported for rotation on the outer race of a bearing assembly 42. The inner race of the bearing assembly 42 is mounted on the outer cylindrical mounting surface 34a of the second annular mounting portion 34 of the hub 30. A snap ring 43 or similar retaining structure is provided for retaining the bearing assembly 42 (and, therefore, the entire electromagnetic clutch 40) upon the hub 30. The rotor pulley assembly 41 is adapted to be constantly rotatably driven by a belt (not shown) or similar member connected to a source of rotational power.

The electromagnetic clutch 40 further includes an armature assembly 44 disposed co-axially adjacent to the rotor pulley assembly 41. The armature assembly 44 is adapted to be selectively connected to the rotor pulley assembly 41 for rotation therewith. To accomplish this, the electromagnetic clutch 40 includes a field assembly 45. The field assembly 45 includes an electromagnet 45a which, when energized, magnetically attracts the armature assembly 44 axially toward the rotor pulley assembly 41. When this occurs, the armature assembly 44 is connected to be rotatably driven with the rotor pulley assembly 41. When the electromagnet 45a is de-energized, a plurality of resilient straps 45b move the armature assembly 44 axially out of engagement with the rotor pulley assembly 41. As a result, the armature assembly 44 is not rotatably driven by the rotor pulley assembly 41.

The armature assembly 44 includes an interior drive sleeve 46 which is connected for rotation therewith. Thus, when the field assembly 45 is energized to connect the armature assembly 44 to the rotor pulley assembly 41, the drive sleeve 46 is rotatably driven by the source of rotational power. The drive sleeve 46 has a key 47 or similar means provided thereon for connecting it to the input shaft 13 of the hydraulic pump 10 for rotation therewith. Thus, when the entire assembly is assembled as shown in FIG. 2, the drive sleeve 46 extends within the hollow hub 30 into rotational driving engagement with the input shaft 13 of the hydraulic pump 10. Bolts 48 or similar fastening means may extend through the aligned non-threaded apertures 12 and 22 into engagement with the threaded apertures 33 to retain the assembly together.

Thus, it can be seen that the hub 30 provides precise co-axial mounting surfaces for both the hydraulic pump 10 (by means of the engagement of the pump flange 11 with the inner cylindrical mounting surface 31b) and the electromagnetic clutch 40 (by means of the engagement of the bearing assembly 42 with the outer cylindrical mounting surface 34a). By mounting the hydraulic pump 10 and the electromagnetic clutch 40 in this manner, the rotational axes of the components thereof (specifically, the input shaft 13 of the hydraulic pump 10 and the drive sleeve 46 and armature assembly 44 of the electromagnetic clutch 40) are precisely maintained co-axial during use.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An assembly comprising:
    a supporting bracket having an opening formed therethrough defining an inner surface;
    a hub including a first mounting portion having an inner surface and an outer surface and a second mounting portion, said outer surface of said first mounting portion engaging said inner surface of said opening to support said hub on said supporting bracket;
    a pump including a rotatable shaft and an outer mounting surface, said pump outer mounting surface engaging said inner surface of said first mounting portion of said hub to support said pump thereon; and
    a clutch including a first member adapted to be rotatably driven, a second member adapted to be selectively connected to said first member for rotation therewith, and a mounting surface, said clutch mounting surface engaging said second mounting portion of said hub to support said clutch therein, said second member being connected to said pump shaft for rotation therewith.

2. The assembly defined in claim 1 wherein said inner and outer surfaces of said hub are cylindrical.

3. The assembly defined in claim 2 wherein said inner and outer surfaces of said hub are concentric.

4. The assembly defined in claim 1 wherein said inner surface of said hub is formed on an inner cylindrical surface of an annular mounting portion formed on said hub.

5. The assembly defined in claim 1 wherein said second mounting portion of said hub is an outer surface and said mounting surface of said clutch is an inner surface.

6. The assembly defined in claim 1 wherein said outer surface of said hub is formed on an outer cylindrical surface of an annular mounting portion formed on said hub.

7. The assembly defined in claim 1 further including means for securing said pump to said hub.

8. The assembly defined in claim 7 wherein said means for securing includes a flange formed on said pump having at least one aperture formed therethrough, a flange formed on said hub having at least one aperture formed therethrough, and a threaded fastener extending through said pump flange aperture and said hub flange aperture to secure said pump to said hub.

9. The assembly defined in claim 1 further including means for securing said clutch to said hub.

10. The assembly defined in claim 9 wherein said means for securing includes a groove formed in said hub and a snap ring disposed within said groove, said snap ring engaging a portion of said clutch to secure said clutch to said hub.

11. An assembly comprising:

a supporting bracket having an opening formed therethrough defining an inner surface;

a hub including a first mounting portion defining an inner mounting surface, a flange portion, and an outer mounting surface, said outer surface of said first mounting portion engaging said inner surface of said opening to support said hub on said supporting bracket, said hub further including a second mounting portion defining an outer mounting surface;

a pump including a rotatable shaft and an outer mounting surface, said pump outer mounting surface being received within said inner mounting surface of said first mounting portion of said hub to support said pump thereon; and a clutch including a first member adapted to be rotatably driven, a second member adapted to be selectively connected to said first member for rotation therewith, and an inner mounting surface, said clutch inner mounting surface being received on said outer mounting surface of said second mounting portion of said hub to support said clutch therein, said second member being connected to said pump shaft for rotation therewith.

12. The assembly defined in claim 11 wherein said support bracket is disposed between said hub and said pump.

13. The assembly defined in claim 12 further including means for securing said pump, said support bracket, and said hub together.

14. The assembly defined in claim 13 wherein said means for securing includes a flange formed on said pump having at least one aperture formed therethrough, at least one aperture formed through said support bracket, a flange formed on said hub having at least one aperture formed therethrough, and a threaded fastener extending through said pump flange aperture, said support bracket aperture, and said hub flange aperture to secure said pump, said support bracket, and said hub together.

15. The assembly defined in claim 11 further including means for securing said clutch to said hub.

16. The assembly defined in claim 15 wherein said means for securing includes a groove formed in said hub and a snap ring disposed within said groove, said snap ring engaging a portion of said clutch to secure said clutch to said hub.

* * * * *